United States Patent [19]

Maekawa et al.

[11] Patent Number: 4,795,676

[45] Date of Patent: Jan. 3, 1989

[54] ELECTROSTATIC RECORDING MATERIAL

[75] Inventors: Toshio Maekawa; Hiroshige Yamauchi, both of Kanagawa; Takashi Toyota, Chiba; Akeo Sawayama, Tokyo; Masaaki Yamanaka, Chiba, all of Japan

[73] Assignee: Oji Paper Co., Ltd., Tokyo, Japan

[21] Appl. No.: 943,944

[22] Filed: Dec. 9, 1986

[30] Foreign Application Priority Data

Dec. 18, 1985 [JP] Japan ................................ 60-285116

[51] Int. Cl.⁴ .......................... G05D 5/12; B32B 5/16; B32B 23/08; D21F 11/00

[52] U.S. Cl. .................................... 428/328; 428/511; 428/535; 428/908; 428/910; 162/138; 346/135.1; 427/121

[58] Field of Search ............... 428/328, 511, 535, 908, 428/910; 162/138; 346/135.1; 427/121

[56] References Cited

U.S. PATENT DOCUMENTS

| | | | |
|---|---|---|---|
| 2,825,814 | 3/1958 | Walkup | 250/49.5 |
| 3,354,464 | 11/1967 | Tsukatani et al. | 346/74 |
| 3,657,005 | 4/1972 | Brown, Jr. et al. | 117/201 |
| 3,711,859 | 1/1973 | Brown et al. | 346/74 ES |
| 3,759,744 | 9/1973 | Schliesman | 427/121 |
| 4,268,595 | 5/1981 | Katugiri et al. | 430/48 |
| 4,318,950 | 3/1982 | Takashi et al. | 428/143 |
| 4,397,883 | 8/1983 | Serlin | 427/14.1 |

*Primary Examiner*—John E. Kittle
*Assistant Examiner*—P. J. Ryan
*Attorney, Agent, or Firm*—Wenderoth, Lind & Ponack

[57] ABSTRACT

In an electrostatic recording material being composed of a multi-layered sheet support having an electroconductive layer and a dielectric layer formed successively thereon, the number of projections having a height of 10 μm or more from the flat surface is limited to a maximum of 50 per 0.1 $m^2$, so that the material has excellent properties and can produce prints of very high quality.

8 Claims, 3 Drawing Sheets

ELECTROSTATIC RECORDING MATERIAL

BACKGROUND OF THE INVENTION

The present invention relates to an electrostatic recording material using a sheet of multi-layered synthetic paper as a support. More particularly, the present invention relates to an electrostatic recording material that employs a sheet of multi-layered synthetic paper as a support suitable for use in electrostatic recording wherein the surface layer of said paper is formed of a clear film layer that is substantially free of any inorganic fine powder.

Electrostatic recording materials wherein the support is formed of a multi-layered sheet of synthetic paper containing 8–65 wt % of an inorganic fine powder in the outermost layer in contact with the electroconductive layer [as described in Japanese Patent Publication No. 40794/1971 (corresponding U.S. Pat. No. 4,318,950) and Japanese Patent Publication Laid-Open No. 141339/1981] are known to have better dimensional stability, water resistance and tensile strength as compared with electrostatic recording materials using pulp paper as the support. They are also superior to electrostatic recording materials which are supported on a clear polyester film that is free from any inorganic fine powder in that they have better adhesion between the support and the electroconductive layer and that they accept writing with a pencil. However, in order to provide improved printing properties, the synthetic paper containing 8–65 wt % of an inorganic fine powder in the outermost layer in contact with the electroconductive layer has inorganic fine particles projected outwardly from the surface. Some of these inorganic particles provide projections or elevations that exceed the general requirements for the surface of electrostatic recording materials and the surface of the support having such elevations is not suitable for use in electrostatic recording materials. For the asperity of the surface, or the gap between the dielectric layer and the charging electrode, that is required for providing satisfactory printed images, Japanese Patent Publication No. 18307/1966 (corresponding to U.S. Pat. No. 3,354,464) teaches the range of 2–20 μm, and Japanese Patent Publication No. 8204/1957 (corresponding to U.S. Pat. No. 2,825,814) teaches the range not exceeding about 10 μm, preferably between 2 and 5 μm. Japanese Patent Publication No. 33703/1981 (corresponding to U.S. Pat. No. 3,657,005 and 3,711,859) discloses a spacer means that projects a distance of 1.27–10.16 μm from the outer surface of the dielectric layer. As shown in these patents, if the height of the spacer projecting from the surface of an electrostatic recording material is excessive, too much difficulty is involved in applying pulsive voltage to perform satisfactory printing. Trouble also arises from the separation (dropping out) of the inorganic fine particles, and solid printed areas in an electrostatic recording material that employs a conventional sheet of synthetic paper as the support contain no less than 50 white spots per 0.1 $m^2$ which are no smaller than 1 mm in diameter.

SUMMARY OF THE INVENTION

An object, therefore, of the present invention is to provide an improved electrostatic recording material that is free from any of the aforementioned problems associated with the use of a multi-layered sheet of synthetic paper as a support.

In order to attain this object, the present inventors made concerted efforts and accomplished the present invention by finding that the heights of elevations that project from the surface of the multi-layered base of synthetic paper and the number of such elevations can be varied by properly selecting the average particle size and the content of the inorganic fine powder to be incorporated in individual layers in the synthetic paper.

The present invention relates to an electrostatic recording material that is indicated by 4 in accompanying FIG. 1 and which is composed of a support 1 that is formed of a multi-layered sheet of synthetic paper and which has an electroconductive layer 2 and a dielectric layer 3 formed successively thereon; said support is a multi-layered film including a surface layer that is formed of a thermoplastic resin film containing 0–3 wt % of an inorganic fine powder and a paper-like layer that is made of a thermoplastic resin film containing 8–65 wt % of an inorganic fine powder, said support containing no more than 50 elevations per 0.1 $m^2$ that project by a height of 10 μm or more from the flat side of said surface layer.

DETAILED DESCRIPTION OF THE INVENTION

Figure 1:
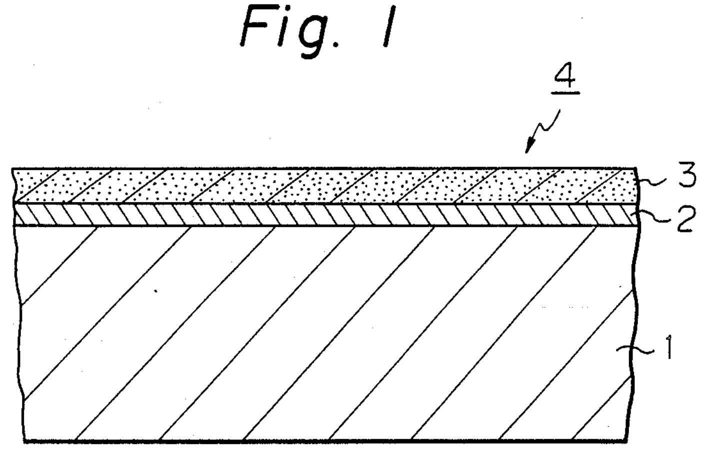
FIG. 1 is a schematic cross section of an electrostatic recording material.
Figure 2:
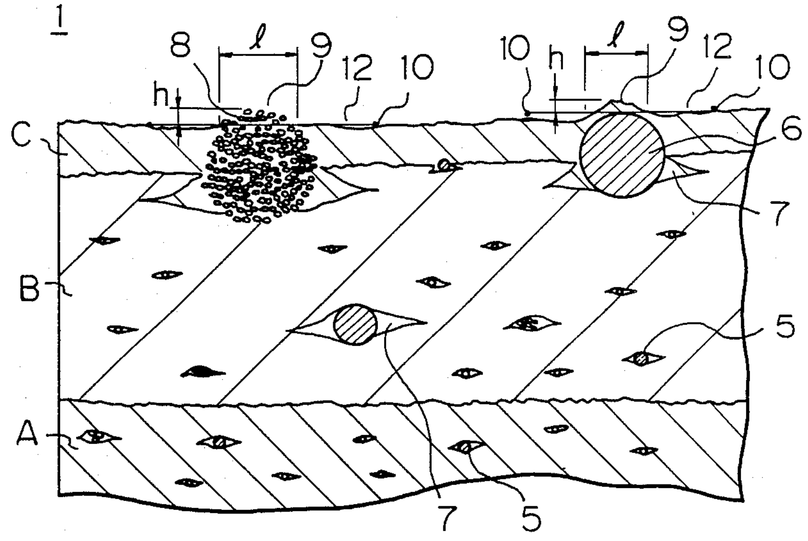
FIG. 2 is a diagrammatic cross-sectional view of a support for an electrostatic recording material prepared in accordance with the present invention.

The support of the electrostatic recording material of the present invention preferably includes a base layer made of a thermoplastic resin in addition to the surface and paper-like layers, as shown in FIG. 2, wherein the support 1 is composed of a paper-like layer B, a surface layer C and a base layer A.

Each of the layers in the support is made of a thermoplastic resin, examples of which include: polyolefin resins such as polyethylene, polypropylene, ethylene-propylene copolymers and ethylene-vinyl acetate copolymers; poly(4-methylpentene-1), polystyrene, polyamides, polyethylene terephthalate, a partially hydrolyzed products of ethylene-vinyl acetate copolymer, ethylene-acrylic acid copolymers and salts thereof, vinylidene chloride copolymers such as vinyl chloride-vinylidene chloride copolymer, and blends of these polymers. Polyolefin resins such as polyethylene and polypropylene are preferable because of their high resistance to solvents.

An inorganic fine powder may be incorporated in the thermoplastic resin, and those which may be incorporated in each of the base and paper-like layers include fine powders of calcium carbonate, calcined clay, diatomaceous earth, talc, titanium oxide, barium sulfate, aluminum sulfate and silica, each of which has an average particle size of 20 μm or less; examples of the inorganic fine powder that may be incorporated in the surface layer include those of calcium carbonate, titanium oxide and barium sulfate.

Each of the layers constituting the support of the electrostatic recording material of the present invention is hereunder described in detail.

(1) Paper-like layer

The paper-like layer is a uniaxially stretched film of a composition that is made of: (a) 35–92 wt % of polypropylene; (b) 0–30 wt % of at least one thermoplastic resin selected from among polystyrene, high-density polyethylene, medium-density polyethylene, low-density polyethylene and an ethylene-vinyl acetate copolymer; and (c) 8–65 wt % of an inorganic fine powder.

Polystyrene, high-density polyethylene, medium-density polyethylene, low-density polyethylene, or ethylene-vinyl acetate copolymer serves to provide improved stretchability, and polystyrene and high-density polyethylene have the additional advantage of producing an easily foldable sheet of synthetic paper. However, the use of these thermoplastic resins is not essential since they are not as effective in the uniaxially stretched film of adhesive layer as in the biaxially stretched film of base layer.

Examples of the inorganic fine powder that is incorporated in the paper-like layer include fine powders of calcium carbonate, calcined clay, diatomaceous earth, talc, titanium oxide, barium sulfate, aluminum sulfate and silica, each of which has an average particle size of 20 μm or less. These fine powders contribute to the purpose of providing an opaque and white paper-like layer having a paper-like texture. In FIG. 2, inorganic fine particles present in the paper-like layer are indicated by 5. Inorganic fine particles that project from the paper-like layer B into the surface layer C as shown by 6 serve as an anchor that increases the adhesion between the surface layer C and the paper-like layer B. Agglomerated inorganic fine particles are shown in the top left portion of FIG. 2 and a giant particle is shown in the top right portion. That part of the agglomeration which projects beyond the flat side 10 of the surface layer C is indicated by 8. In order to ensure the production of highly opaque synthetic paper, the content of the inorganic fine powder in the paper-like layer should be at least 8 wt %. However, the upper limit should be 65 wt % in order to provide the necessary mechanical strength properties (e.g., compressive strength and tensile strength) for the paper-like paper.

A preferable composition of the paper-like layer is shown below:

| | |
|---|---|
| (a) polypropylene | 45-65 wt % |
| (b) thermoplastic resin such as polyethylene | 0-5 wt % |
| (c) inorganic fine powder | 35-55 wt % |

The paper-like layer is provided on one or both sides of the base layer if the latter is used at all.

(2) Surface layer

The surface layer is formed of a uniaxially stretched film of a composition which is made of: (a) 40–60 wt % of polypropylene; (b) 60–40 wt % of high-density polyethylene and (c) 0–3 wt % of an inorganic fine powder. The high-density polyethylene preferably has a density within the range of 0.940–0.970 g/cm$^3$. The function of the high-density polyethylene is twofold: it renders the transparent polypropylene opaque in the absence of any inorganic fine powder; and it reduces the surface gloss and smoothness to an extent which facilitates not only the writing of characters on the synthetic paper with a pencil or felt pen but also the viewing thereof. The high-density polyethylene is used in an amount of 40–60 wt %.

If the surface layer is as thin as 0.5–10 microns, it may be made of polypropylene alone.

For the purpose of preventing the occurrence of many white spots in solid printed areas, the surface layer C is preferably devoid of any inorganic fine powder 6. However, the powder may be incorporated if one has the need to provide better adhesion to the electroconductive layer and to increase the opacity of the support. In this case, the addition of the inorganic fine powder should not exceed 3 wt %. The inorganic fine powder preferably has an average particle size of 3 μm or less for the purpose of limiting the height of projections of the inorganic particles and thereby preventing the occurrence of many white spots in solid printed areas. Examples of the inorganic fine powder that can be incorporated in the surface layer include those of calcium carbonate, titanium oxide and barium sulfate.

It is essential for attaining the objects of the present invention that the number of elevations 8 that project from the flat side of the surface layer by a height of 10 μm or more should not be greater than 50 per 0.1 m$^2$. The height of an elevation is represented by h in FIG. 2. The height of 10 μm is critical because even those inorganic fine particles having an average size of not greater than 3 μm may agglomerate with one another to form giant particles of 10 μm or larger. The "flat side" of the surface layer may be determined by a method of which procedures are shown in FIG. 3.

Figure 3:
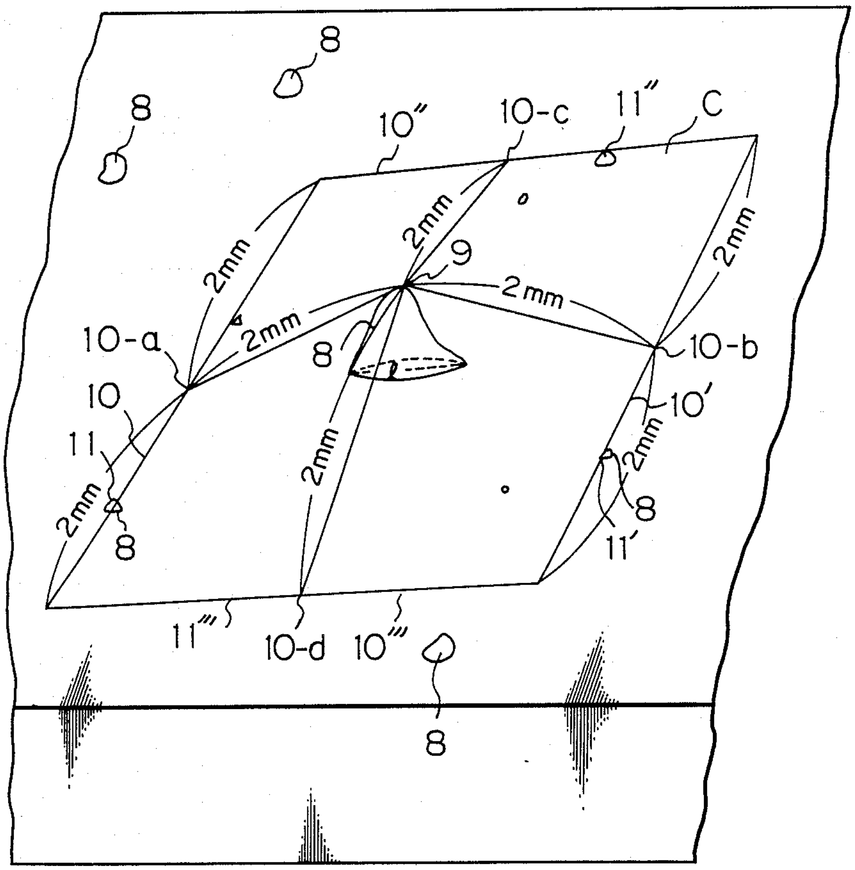
FIG. 3 is an illustration of the method for determining a flat side that serves as a reference for the measurement of the heights of projections on the support.
Figure 4:
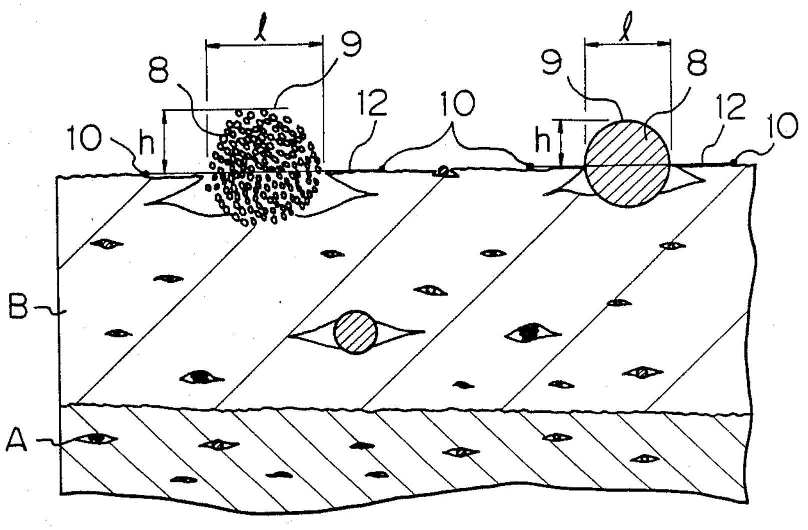
FIG. 4 is a diagrammatic cross-sectional view of a support that is employed in the electrostatic recording material prepared in Comparative Example 1.

Suppose that the surface layer C has projections 8 as shown in FIGS. 2, 3 and 4. Take one projection 8 having the apex 9; draw two 4-mm long lines 10 and 10' that are perpendicular to the major axis (l) of the base of the projection and which are divided into two halves by points 10-*a* and 10-*b*, respectively, on the surface C of synthetic paper each of which is 2 mm distant from the apex 9 in the direction parallel to the major axis (l); measure the thickness of the synthetic paper along the two lines 10 and 10' with a continuous thickness gage, Electronic Micrometer K-306 (trade name of Anritsu Electric Co., Ltd.), and identify the highest points 11 and 11' on the respective lines; draw two 4-mm long lines, 10'' and 10''' that are parallel to the major axis (l) and which are divided into two halves by points 10-*c* and 10-*d*, respectively, on the surface C of the synthetic paper, each of which is 2 mm distant from the apex in the direction perpendicular to the major axis (l); measure the thickness of the synthetic paper along the two lines 10'' and 10''' with Electronic Micrometer K-306 and identify the highest points 11'' and 11''' on the respective lines; select the three highest points of 11, 11', 11'' and 11''' and designate a plane containing these three points as a flat side 12 (which is obtained by connecting 11, 11' and 11'' in FIG. 3).

If the apexes 11, 11', 11'' and 11''' as determined by measurement along the lines 10, 10', 10'' and 10''' with a continuous thickness gage are at least 10 μm higher than the lowest points on the respective lines, obtain another set of central points, 10-*a* to 10-*d*, in the vicinity of the corresponding points 10-*a* to 10-*d* on the respective lines 10, 10', 10'' and 10''', and repeat the same procedures as described above in order to determine a flat side 12.

If the number of elevations that project from the so determined flat side of the surface layer by a height of 10 μm or more exceeds 50 per 0.1 $m^2$, undesirable phenomena will occur as manifested by the difficulty in achieving sharp prints of characters and the occurrence of many white spots in solid printed areas.

The surface layer generally has a smoothness of no more than 3,000 seconds, preferably not more than 500 seconds, in terms of Bekk index as measured in accordance with JIS P-8119. If the opposite side of the synthetic paper is formed of the paper-like layer rather than the base layer, the surface layer has a smoothness of 200–2,000 seconds in terms of Bekk index. In order to ensure the provision of a paper-like texture, the surface layer generally has a gloss of no more than 45% preferably not more than 35%, as measured in terms of 75° reflectance. The surface layer is laminated onto the paper-like layer.

(3) Base layer

The base layer is not essential in the present invention. For instance, no base layer need to be provided if the support is made of a two-layer sheet of synthetic paper that is composed of an unoriented surface layer and a uniaxially stretched paper-like layer. It is however generally advantageous to provide a base layer.

The base layer, if used at all, is formed of a biaxially stretched film of a composition that is made of: (a) 50–95 wt % of polypropylene; (b) 0–30 wt % of at least one thermoplastic resin selected from among high-density polyethylene, medium-density polyethylene, low-density polyethylene and ethylene-vinyl acetate copolymer; and (c) 50–55 wt % of an inorganic fine powder. Low-density polyethylene, medium-density polyethylene, high-density polyethylene or ethylene-vinyl acetate copolymer is used for the purpose of facilitating the stretching of synthetic paper and of providing enhanced adhesion to the adhesive layer. These thermoplastic resins contribute to the purpose of providing improved stretchability and impact resistance but they should not be added in amounts in excess of 30 wt % in order to avoid the decrease in the folding strength of synthetic paper. The inorganic fine powder may be of the same kind as used in the paper-like layer and achieves the following functions: upon stretching, a large number of fine pores are produced within the base layer as shown in FIG. 2, and these pores contribute to the production of light synthetic paper that has an opaque base layer and which is easy to stretch. The upper limit of the amount in which the inorganic fine powder is used in the base layer is 50 wt %. As more of the inorganic fine powder is used, more pores will develop in the film of base layer; this is effective in making the synthetic paper lighter and more opaque, but on the other hand, the tensile strength of the synthetic paper is decreased.

A preferable composition of the base layer is shown below:

| | | |
|---|---|---|
| (a) | polypropylene | 60–85 wt % |
| (b) | thermoplastic resin such as polyethylene | 0–8 wt % |
| (c) | inorganic fine powder | 15–40 wt % |

The thickness of each of the three layers constituting the support of the electrostatic recording material of the present invention is discussed in the following pages.

The overall thickness of the multi-layered synthetic paper generally ranges from 40 to 800 μm, preferably from 60 to 300 μm. At least 40% of this thickness is assumed by the base layer A. Each of the surface layer C and the back layer C has a thickness within the range of 0.5–10 μm. If the thickness of the surface layer C is less than 0.5 μm, any of the inorganic particles that project beyond the surface of the paper-like layer B will also project beyond the surface layer C and may be dislodged therefrom, thereby making it impossible to prevent the occurrence of many white spots in solid printed areas. As already mentioned, the particle size of the inorganic fine powder in the paper-like layer is usually not more than 3 μm, preferably between 0.05 and 1.8 μm. If the thickness of the surface layer C exceeds 10 μm, the surface-roughening effect of the paper-like layer B and its appearance will be hidden by the surface layer C and the resulting synthetic paper fails to attain a paper-like feel since the surface layer has high degrees of gloss and smoothness. In order to provide sufficient coverage of the base layer A, the thickness of the paper-like layer B should be at least 8 μm, preferably within the range of 20–100 μm.

The synthetic paper preferably contains pores 7 in an amount which ranges from 15 to 65% in terms of void volume that is defined by:

$$\text{void volum} = \frac{\rho_0 - \rho_1}{\rho_0} \times 100$$

where $\rho_0$: the density of an unstretched film $\rho_1$: the density of a stretched film.

The degree of stretching is from 4:1 to 10:1 in the machine direction and from 4:1 to 12:1 in the transverse direction. The temperature for stretching ranges from 140° to 158° C. for stretching in the machine direction, and is higher than the melting point of polypropylene (i.e., 163°–168° C.) for stretching in the transverse direction.

The synthetic paper serving as the support of the electrostatic recording material of the present invention may be fabricated by the following method: the composition for the base layer is extruded in a sheet form and stretched unidirectionally at a temperature lower than the melting point of polypropylene to make a base layer A that is formed of a uniaxially oriented film; two compositions, one for the paper-like layer B and the other for the surface layer C, are molten and laminated together, and the laminate is coextruded onto both sides of the base layer A in such a manner that the paper-like layer is brought into contact with the base layer; subsequently, the resulting laminate is stretched at a temperature higher than the melting point of polypropylene in the direction perpendicular to that employed in the previous stretching. An alternative method may be performed as follows: a uniaxially oriented film of base layer A is provided by stretching in the machine direction; two compositions, one for the paper-like layer B and the other for the surface layer C, are molten and laminated together, and the laminate is placed on one side of the base layer A in such a manner that the paper-like layer B is brought into contact with the base layer A; a molten film of a composition for the paper-like layer B is laminated onto the other side of the base layer A in a separate extruder; and the resulting laminate is stretched in the transverse direction to form a multilayered sheet of synthetic paper.

The inorganic fine powder incorporated in the base layer is responsible for the presence of a large number of tiny pores within the film of base layer.

The base layer formed of a uniaxially stretched film contributes to the high strength of the synthetic paper. The film of paper-like layer presents a paper-like feel. If the paper-like layer was formed of a biaxially stretched film, it would present a pearl-like luster and its texture would depart from a paper-like texture. The use of a uniaxially stretched film as the paper-like layer serves to cover the base layer and provide a paper-like texture to the synthetic paper.

The surface layer covers the paper-like layer so as to prevent the separation of the fine inorganic particles therefrom and to provide a surface that is rough enough to admit writing thereon.

In order to provide increased ink receptivity, the surface layer and the back surface of the synthetic paper serving as the support of the electrostatic recording material may be subjected to a corona discharge treatment.

Printing can be made on the surface layer of the synthetic paper either by gravure printing, screen printing or flexographic printing. The surface layer also admits of writing with a oil based ink pen or a pencil. If the back side of the synthetic paper is formed of the paper-like paper rather than the surface layer, the synthetic paper admits of printing not only by the aforementioned techniques but also by offset multi-color printing. The adaptability of this type of synthetic paper for writing with a pencil is greater than when the back side of the paper has the surface layer.

The electrostatic recording material of the present invention is produced by successively forming an electroconductive layer 2 and a dielective layer 3 on the support having the construction described above.

An electroconductive layer 2 may be formed by applying onto the support a conductive resin selected from the group consisting of cationic high-molecular weight electrolytes (e.g. quaternary ammonium salts such as polyvinylbenzyl trimethyl ammonium chloride, polydimethyldiallyl ammonium chloride, and styrene acrylic acid trimethyl aminoethyl chloride) and anionic high-molecular weight electrolytes (e.g. polystyrene sulfonic acid salts, polyacrylic acid and polyvinyl phosphonate). These conductive resins may be applied either independently or in admixture with water-soluble or water-reducible adhesive agents or other compounds that are capable of providing enhanced adhesion to the support.

The conductive paint may be applied to the multilayered polyolefinic synthetic paper with a suitable device such as a bar coater, air-knife coater or blade coater.

The amount in which the electroconductive layer is applied depends on the content of the conductive resin but it is preferably adjusted in such a manner that the resulting conductive layer has a surface resistivity of the order of $10^6$–$10^8$ ohms. If the support is translucent, it must be rendered electrically conductive with care being taken not to impair the transparency of the support; a suitable conductive resin is preferably used either alone or in combination with an auxiliary agent or adhesive agent that is capable of providing enhanced adhesion to the support, and it is best advised to avoid the use of pigments. The conductive layer is typically applied in an amount ranging from 2 to 10 g/m$^2$, desirably from 2 to 7 g/m$^2$, on a solids basis.

A dielectric layer 3 is formed on the conductive layer and examples of the material of this layer include: vinyl acetate resin, ethylene-vinyl acetate copolymer resin, vinyl chloride resin, vinyl chloride-vinyl acetate copolymer resin, vinylidene chloride resin, vinyl chloride-vinylidene chloride copolymer resin, acrylic acid ester resin, methacrylic acid ester resin, butyral resin, silicone resin, polyester resin, vinylidene fluoride resin, nitrocellulose resin, styrene resin, and styrene-acrylonitrile copolymer resin. In addition to these resins, almost all of the resins that have volume resistivities no smaller than $10^{12}$ Ωcm may be employed. Blends of these resins may also be employed and they include: two-component systems such as vinyl acetate resin/nitrocellulose resin, acrylate ester resin/nitrocellulose resin, ethylene-vinyl acetate copolymer resin/nitrocellulose resin, vinyl acetate resin/ethylene-vinyl acetate copolymer resin, acrylate ester resin/vinyl acetate resin, acrylate ester resin/-vinyl chloride-vinyl acetate copolymer resin, and acrylate ester resin/styrene resin; and three-component systems such as styrene resin/methacrylate ester resin/styrene-acrylonitrile copolymer resin, and vinylidene fluoride resin/methacrylate ester resin/stryrene-acrylonitrile copolymer resin. These resins or resin blends may be mixed with pigments such as inorganics (e.g. zinc oxide, titanium oxide, calcium carbonate, silicic acid, silicic acid salts, clay, talc, calcined clay, sericite, mica, barium sulfate and lithopone) and organics (e.g. polyethylene powder, polystyrene powder, starch powder, and cellulose powder). The mixing ratio of the dielectric resin and pigment is preferably within the range of 40:60 to 90:10.

As in the application of the conductive layer, the dielectric paint may be applied by such means as a bar coater, air-knife coater or blade coater. The amount in which the dielectric layer is applied is determined in consideration of the characteristics of the printer with which the resulting electrostatic recording material is to be use; it is typically within the range of 3–9 g/m$^2$, desirably 5–7 g/m$^2$.

The electrostatic recording material of the present invention has the advantage of providing high-quality prints having a reduced number of tiny clear spots in solid printed areas and yet retaining good properties in regard to dimensional stability, water resistance and strength.

The advantages of the electrostatic recording material of the present invention are hereunder described in greater detail with reference to working examples and comparative examples.

Before describing the working examples and comparative examples, the preparation of several types of synthetic paper suitable for use as the support of the electrostatic recording material are shown below.

PREPARATION EXAMPLE 1

(1) Base layer A

A mixture of 80 wt % of polypropylene having a melt flow rate (MFR) of 0.8 and 20 wt % of calcium carbonate powder having an average particle size of 1.5 microns was kneaded in an extruder held at 270° C., then extruded into a sheet. The extrudate was cooled with a cooling device to obtain an unstretched sheet. The sheet was heated to 145° C. and stretched to 5:1 in the machine direction.

(2) Paper-like layer B and surface layer C

A mixture for providing a paper-like layer B that was composed of 50 wt % of polypropylene (MFR=4.0) and 50 wt % of a calcium carbonate powder, and a mixture for providing a surface layer C that was composed of 50 wt % of polypropylene (MFR=4.0) and 50 wt % of high-density polyethylene (the second mixture containing no inorganic fine powder), were molten and kneaded in separate extruders at 270° C., and fed into a single die where the extrudates were laminated together. The laminate was coextruded onto both sides of the 5:1 stretched base sheet in such a manner that the surface layer C containing no calcium carbonate powder was situated outside. The resulting five-layer laminate was then heated to 185° C. and stretched to 7.5:1 in the transverse direction to obtain a five-layered film of synthetic paper.

(3) Both surfaces of the five-layered film were subjected to a corona discharge treatment. The individual film layers arranged in the order of C, B, A, B and C had the respective thicknesses of 3, 17, 40, 17 and 3 μm.

The surface layer C on each side of the laminated sheet had a Bekk index of 300 seconds. The layer had an opacity of 37%, a gloss of 38% and a whiteness of 91%. The synthetic paper had good ink receptivity in gravure printing and permitted writing with a pencil. The number of elevations that projected from the surface by heights of 10 μm or more was 18 per 0.1 $m^2$.

PREPARATION EXAMPLE 2

(1) Base layer A

A mixture of 80 wt % of polypropylene (MFR=0.8) and 8 wt % of high-density polyethylene was blended with 12 wt % of calcium carbonate powder having an average particle size of 1.5 microns. The blend was kneaded in an extruder held at 270° C., then extruded into a sheet. The extrudate was cooled with a cooling device to obtain an unstretched sheet. The sheet was heated to 140° C. and stretched to 5:1 in the machine direction.

(2) Paper-like layer B and surface layer C

A composition for providing a paper-like layer B was formed from a mixture of 49 wt % of polypropylene (MFR=4.0), 5 wt % of polypropylene (modified with 0.5 wt % maleic acid) and 46 wt % of calcium carbonate powder having an average particle size of 1.5 microns. This composition, which contained 0.05 parts by weight of the modifying monomer per 100 parts by weight of the filler, was melted and kneaded in an extruder set at 270° C. Polypropylene C with MFR=4.0 was melted and kneaded in a separate extruder which was also set at 270° C. The two extrudates were laminated together in a die and the resulting laminate was coextruded onto one side of the 5:1 stretched sheet in such a manner that the layer C containing the modified polypropylene was situated outside.

A composition for the paper-like layer B was melted in a separate extruder and the molten film was laminated onto the other side of the base layer A. The resulting four-layered laminate was heated to 155° C. and stretched to 7.5:1 in the transverse direction.

(3) The surfaces of the four-layered film were subjected to a corona discharge treatment. The individial film layers arranged in the order of C, B, A and B had the respective thicknesses of 5, 10, 50 and 20 μm.

The surface layer C had a Bekk index of 250 seconds while the back layer B had a Bekk index of 150 seconds. The number of elevations that projected from the surface C by heights of 10 μm or more was 7 per 0.1 $m^2$.

PREPARATION EXAMPLE 3

(1) Base layer A

A mixture of 79 wt % of polypropylene (MFR=0.8) and 5 wt % of high-density polyethylene was blended with 16 wt % of calcium carbonate powder having an average particle size of 1.5 microns. The blend was kneaded in an extruder held at 270° C., then extruded into a sheet. The extrudate was cooled with a cooling device to obtain an unstretched sheet. The sheet was heated to 140° C. and stretched to 5:1 in the machine direction.

(2) Paper-like layer B and surface layer C

Polypropylene (MFR=4.0) for providing a surface layer and a composition for providing a paper-like layer B that was a mixture of 55 wt % of polypropylene (MFR=4.0) and 45 wt % of calcium carbonate powder having an average particle size of 1.5 μm were molten and kneaded in separate extruders. The two extrudates were laminated together in a die. The resulting laminate was coextruded onto both sides of the 5:1 stretched sheet in such a manner that the surface layer C was situated outside. The five-layered film was cooled to 60° C., heated to about 160° C., stretched with a tenter to 7.5:1 in the transverse direction, annealed at 165° C., and cooled to 60° C. By cutting off the margins, a five-layered sheet of synthetic paper consisting of layers C, B, A, B and C was obtained.

The respective layers had thicknesses of 3, 20, 45, 20 and 3 μm. The surface layers had a gloss of 65%, a smoothness of 560 seconds and a bulk density of 0.77 g/$cm^3$; they were highly suitable for writing not only with a pencil but also in water-based ink, and had good ink receptivity in offset and gravure printing. The number of elevations that projected from the surface layer by heights of 10 μm or more was 18.5 per 0.1 $m^2$.

PREPARATION EXAMPLE 4

(FOR COMPARISON)

(1) Base layer A

A mixture of 79 wt % of polypropylene (MFR=0.8) and 5 wt % of high-density polyethylene was blended with 16 wt % of calcium carbonate powder having an average particle size of 1.5 microns. The blend was kneaded in an extruder set to 270° C., then extruded into a sheet. The extrudate was cooled with a cooling device to obtain an unstretched sheet A. This sheet was heated to 140° C. and stretched to 5:1 in the machine direction.

(2) Paper-like layer B

A composition for providing a paper-like layer B that was a mixture of 55 wt % of polypropylene (MFR=4.0) and 45 wt % of calcium carbonate powder having an average particle size of 1.5 microns was melted and kneaded in an extruder, from what the melt was extruded through a die to form a sheet. The sheet was laminated onto both sides of the 5:1 stretched sheet, cooled to 60° C., heated to about 160° C., stretched on a tenter to 7.5:1 in the transverse direction, annealed at 165° C. and cooled to 60° C. By cutting off the margins, a three-layered sheet of synthetic paper was obtained; it consisted of the layer B 25 μm thick, the layer A 45 μm thick, and the layer B 25 μm thick (see FIG. 4).

The paper-like layer B had a Bekk index of 450 seconds and a gloss of 16%. The synthetic paper so prepared was highly suitable for writing with a pencil. However, the number of elevations that projected from the paper-like layer B by heights of 10 μm or more was 72 per 0.1 $m^2$.

PREPARATION EXAMPLE 5

(1) Base layer A

A mixture of 79 wt % of polypropylene (MFR=0.8) and 5 wt % of high-density polyethylene was blended with 16 wt % of calcium carbonate powder having an average particle size of 1.5 microns. The blend A was kneaded in an extruder set to 270° C., then extruded into a sheet. The sheet was cooled with a cooling device to obtain an unstretched sheet. This sheet was heated to 140° C. and stretched to 5:1 in the machine direction.

(2) Paper-like layer B and surface layer C

Polypropylene C with MFR=4.0 and a composition for providing a paper-like layer that was a mixture of 55 wt % of polypropylene (MFR=4.0) and 45 wt % of calcium carbonate powder having an average particle size of 1.5 microns were molten and kneaded in separate extruders. The two extrudates were laminated together in a die. The resulting laminate was coextruded onto both sides of the 5:1 stretched sheet in such a way that the surface layer C was situated outside. The five-layered film was cooled to 60° C., heated to about 160° C., stretched on a tenter to 7.5:1 in the transverse direction, annealed at 165° C., and cooled to 60° C. By cutting off the margins, a five-layered sheet of synthetic paper consisting of layers C, B, A, B and C was obtained.

The respective layers has thickness of 10, 15, 40, 15 and 10 μm. The surface layers had a gloss of 65%, a smoothness of 2800 seconds and a bulk density of 0.87 g/$cm^3$; they admitted writing with a pencil, as well as printing by offset printing or gravure printing. The number of elevations that projected from the surface by heights of 10 μm or more was 5 per 0.1 $m^2$.

PREPARATION EXAMPLE 6

(1) Base layer A

A blend of 80 wt % of polypropylene (MFR=0.8) and 20 wt % of calcium carbonate powder having an average particle size of 1.5 μm was kneaded in an extruder set at 270° C., then extruded into a sheet. The sheet was cooled with a cooling device to obtain an unstretched sheet. This sheet was heated to 145° C. and stretched to 5:1 in the machine direction.

(2) Paper-like layer B and surface layer C

A mixture for providing a paper-like layer B that was composed of 50 wt % of polypropylene (MFR=4.0) and 50 wt % of calcium carbonate powder and a mixture for providing a surface layer C that was composed of 50 wt % of polypropylene (MFR=4.0) and 50 wt % of high-density polyethylene were molten and kneaded in separate extruders at 270° C. The two extrudates were then fed into a single die and laminated together. The resulting laminate was coextruded onto both sides of the 5:1 stretched sheet A in such a way that the surface layer C containing no calcium carbonate powder was situated outside. Subsequently, the five-layered laminate was heated to 185° C. and stretched to 7.5:1 in the transverse direction to obtain a five-layered film of synthetic paper.

(3) Both surfaces of the five-layered film were subjected to a corona discharge treatment. The individual film layers arranged in the order of C, B, A, B and C had the respective thicknesses of 1, 19, 40, 19 and 1 microns. The surface layer C had a Bekk index of 300 seconds. The layer had and opacity of 36%, a gloss of 32%, and a whiteness of 92%. The synthetic paper had good ink receptivity in gravure printing and permitted writing with a pencil. However, the paper was not suitable for offset printing because of its poor ink receptivity in that particular type of printing. The number of elevations that projected from the surface layer C by heights of 10 μm or more was 50 per 0.1 $m^2$.

EXAMPLE 1

An electroconductive support was prepared from the synthetic paper of Preparation Example 3 by applying a 25% aqueous solution of an acrylic resin containing quaternary ammonium salt (Gosefymer C 800 of Nippon Gosei Kagaku Co., Ltd.) to give a coating weight of 3.0 g/$m^2$ on a dry basis. The support had a surface resistivity of $1.0\times10^7$ ohms at 25° C. and at 45% R.H. In order to keep the support transparent, no pigment was incorporated.

Three hundred and fifty parts by weight of a 20% solution of a vinyl chloride-vinyl acetate (55:45) copolymer in an 80:20 mixed solvent of toluene and ethyl acetate was mixed with 30 parts by weight of calcium carbonate powder having an average particle size of 1.2 μm (NS 1000 of Nitto Funka Kogyo K.K.) and the calcium carbonate particles were dispersed in the copolymer solution by treatment with a paint conditioner for 10 minutes. The resulting paint was applied onto the conductive support in a coating weight of 6.0 g/$m^2$ on a dry basis.

The properties of the so prepared electrostatic recording material were evaluated in regard to water resistance, dimensional stability and strength. The recording material was set in a commercial facsimile apparatus (UF 20S of Matsushita Graphic Communication Systems, Inc.) and recording was conducted with a view to evaluating the quality of prints, suitability for use as diazo original intermediates, adhesion of the coating layers, and the number of white spots (dia. ≧1 mm) that occurred in solid printed areas. The results of evaluation are summarized in Table 1.

EXAMPLE 2

An electroconductive support was prepared from the opaque, 4-layered sheet of synthetic paper of Preparation Example 2 by the following procedures: a conductive coating composed of 100 parts of conductive resin (CS 6300 of Sanyo Chemical Co., Ltd.; 33.5% solids content), 40 parts by weight of an adhesive agent (Movinyle S100 of Hoechst Gosei K.K.; 50% solids content) and 50 parts by weight of clay was applied to the sheet of synthetic paper in a coating weight of 6.0 g/$m^2$ on a dry basis, and the applied coating was supercalendered to provide a smooth surface having a Bekk index of about 1,000 seconds. The support had a surface resistivity of $1.2\times10^7$ ohms at 25° C. and at 45% R.H. A dielectric layer was applied onto the so prepared conductive support as in Example 1. The properties and printing performance of the resulting electrostatic recording material are summarized in Table 1.

COMPARATIVE EXAMPLE 1

An electroconductive support was prepared from a translucent sheet of synthetic paper (thickness, 75 μm; Yupo TPG 75 of Oji Yuka Goseishi Co., Ltd.; 125 elevations existed per 0.1 $m^2$ that projected from the surface by heights of 10 μm or more) by applying a 25% aqueous solution of an acrylic resin containing quaternary ammonium salt (Gosefymer C 800 of Nippon Gosei Kagaku Co., Ltd.) to give a coating weight of 3.0 $g/m^2$ on a dry basis. The support had a surface resistivity of $1.0\times10^7$ ohms at 25° C. and 45% R.H. In order to keep the support transparent, no pigment was incorporated.

Three hundred and fifty parts by weight of a 20% solution of vinyl chloride-vinyl acetate (55:45) copolymer in an 80:20 mixed solvent of toluene and ethyl acetate was mixed with 30 parts by weight of a calcium carbonate powder having an average particle size of 1.2 μm (NS 1000 of Nitto Funka Kogyo K.K.) and the calcium carbonate particles were dispersed in the copolymer solution by treatment with a paint conditioner for 10 minutes. The resulting paint was applied onto the conductive support in a coating weight of 6.0 $g/m^2$ on a dry basis. The properties and printing performance of the resulting electrostatic recording material are summarized in Table 1.

COMPARATIVE EXAMPLE 2

An electroconductive support was prepared from the synthetic paper of Preparation Example 4 by the following procedures: conductive coating composed of 100 parts of a conductive resin (CS 6300 of Sanyo Chemical Co., Ltd.; 33.5% solids content), 40 parts by weight of an adhesive agent (Movinyle S100 of Hoechst Gosei K.K.; 50% solids content) and 50 parts by weight of clay was applied to the sheet of synthetic paper in a coating weight of 6.0 $g/m^2$ on a dry basis, and the applied coating was supercalendered to provide a smooth surface having a Bekk index of 1,000 seconds. The support so treated had a surface resistivity of $1.2\times10^7$ ohms at 25° C. and at 45% R.H.

A dielectric layer was applied onto the so prepared conductive support as in Example 1. The properties and printing performance of the resulting electrostatic recording material are summarized in Table 1.

EXAMPLES 3-5

Three additional samples of electrostatic recording material were prepared as in Example 1 except that the sheets of synthetic paper fabricated in Preparation Examples 1, 5 and 6 were used as the supports. The properties and printing performance of these samples are summarized in Table 1.

TABLE 1

| Run No. | Support | Smoothness of the surface layer (sec) | Number of elevations per 0.1 $m^2$ whose height was 10 μm or more*6 | Adaptability of the back surface for writing with pencil | Number of tiny white spots per $m^2$ of solid printed area*5 | Recording density*1 | Dimensional stability*2 elongation (%) | Dimensional stability*2 contraction (%) | Water resistance*3 | Adhesion of coating layers*4 |
|---|---|---|---|---|---|---|---|---|---|---|
| Ex. 1 | Preparation Ex. 3 | 560 | 18.5 | fair | 17 | 1.1 | ≦0.1 | ≦0.1 | good | good |
| Ex. 2 | Preparation Ex. 2 | 250 | 7 | good | 6 | 1.1 | ≦0.1 | ≦0.1 | good | good |
| Comp. Ex. 1 | TPG-75 of Oji Yuka Goseishi Co., Ltd. | 85 | 125 | good | 118 | 1.1 | ≦0.1 | ≦0.1 | good | good |
| Comp. Ex. 2 | Preparation Ex. 4 | 450 | 72 | good | 75 | 1.1 | ≦0.1 | ≦0.1 | good | good |
| Ex. 3 | Preparation Ex. 1 | 300 | 18 | good | 19 | 1.2 | ≦0.1 | ≦0.1 | good | good |
| Ex. 4 | Preparation Ex. 5 | 2800 | 5 | fair | 3 | 1.2 | ≦0.1 | ≦0.1 | good | good |
| Ex. 5 | Preparation Ex. 6 | 630 | 50 | good | 45 | 1.1 | ≦0.1 | ≦0.1 | good | good |

Notes:
[1]Measured as reflection density with a McBeth densitometer (Model RD-100R of McBeth Corporation).
[2]Elongation at 20° C. and 85% R. H. and shrinkage at 20° C. and 30% R. H. are expressed as percentages of the value for 20° C. and 65% R. H.
[3]Waterdrops were deposited on both surfaces of the recording material and the state thereof was examined after 30 seconds: samples having dips on the wetted surfaces were rated bad, and those having very few dips were rated good.
[4]A commercial self-adhesive cellophane tape was adhered to the recorded surface of a sample by reciprocating a 2-kg roller over it three times; the tape was then peeled off at a rate of 50 mm/min and the legibility of the recorded characters was checked.
[5]The number of white spots on solid printed area that were 1 mm or larger in diameter was counted.
[6]Data for the number of elevations whose height was 10 μm or more was obtained by the following procedures:
(1) A sample support cut to a size of 20 cm × 25 cm was illuminated by light at an angle and any projecting areas were marked by visual inspection;
(2) The marked areas were observed with a steromicroscope at a magnification of 25, and the number of elevations whose height was 50 μm or more as measured with a peak scale magnifying glass on scale No. 2 was counted;
(3) The above procedures were repeated for 2 samples and the total number of relevant elevations was counted for 0.1 $m^2$;
(4) All of these elevations were analyzed with a three-dimensional roughness analyzer, Model SPA. 11 of Kosaka Kenkusho K. K., and the number of elevations whose height was 20 μm or more was counted per 0.1 $m^2$.

As is clear from Table 1, the samples of recording material prepared in Comparative Examples 1 and 2 had much more clear spots in solid printed areas than those prepared in Examples 1 to 5.

As the above results show, an electrostatic recording material that is supported on a multi-layered sheet of synthetic paper wherein the outermost layer (surface layer) which is in contact with an electroconductive layer is formed of a clear film layer that is substantially free from any inorganic fine powder has excellent properties and produces prints of very high quality.

What is claimed is:

1. An electrostatic recording material which is composed of a support that is formed of a multi-layered sheet of synthetic paper and which has an electroconductive layer an a dielectric layer formed successively thereon, said support being a multi-layered film formed from a base layer of a stretched film, paper-like layers which are made from a thermoplastic resin film containing 8 to 65% by weight of inorganic fine powder formed on both sides of said base layer and surface layers which are formed from a thermoplastic resin film containing 0–3 wt % of inorganic fine powder and formed on each of said paper-like layers, said support containing no more than 50 elevations per 0.1 $m^2$ that project by a height of 10 $\mu$m or more from the flat side of said surface layer.

2. The electrostatic recording material according to claim 1 wherein said paper-like layer is formed of a uniaxially stretched thermoplastic resin film that has the following composition: (a) 35–92 wt % of polypropylene; (b) 0–30 wt % of at least one resin selected from the group consisting of polystyrene, high-density polyethylene, medium-density polyethylene, low-density polyethylene, and an ethylene-vinyl acetate copolymer; and (c) 8–65 wt % of an inorganic fine powder.

3. The electrostatic recording material according to claim 1 wherein said surface layer is formed of a uniaxially stretched thermoplastic resin film that has the following composition: (a) 40–60 wt % of polypropylene; (b) 60–40 wt % of high-density polyethylene; and (c) 0–3 wt % of an inorganic fine powder having a particle size of 3 $\mu$m or less.

4. The electrostatic recording material according to claim 1 wherein the surface layer is formed on only the paper-like layer provided on the obverse surface of said base layer.

5. The electrostatic recording material according to claim 1 wherein the base layer is formed of a biaxially stretched film having the following composition: (a) 50–95 wt % of polypropylene; (b) 0–30 wt % of at least one resin selected from the group consisting of high-density polyethylene, medium-density polyethylene, low-density polyethylene and an ethylene-vinyl acetate copolymer; and (c) 50–5 wt % of inorganic fine powder.

6. The electrostatic recording material according to claim 1 wherein the film serving as the surface layer has a thickness of 1–10 $\mu$m.

7. An electrostatic recording material according to claim 1 wherein the surface layer has a surface smoothness of 3,000 seconds or less in terms of Bekk smoothness as measured by the method described in JIS P-8119.

8. The electrostatic recording material according to claim 4 wherein the base layer is formed of a biaxially stretched film having the following composition (a) 50–95 wt % of polypropylene; (b) 0–30 wt % of at least one resin selected from the group consisting of high-density polyethylene, medium-density polyethylene, low-density polyethylene and an ethylene-vinyl acetate copolymer; and (c) 50–5 wt % of inorganic fine powder.

* * * * *